Nov. 20, 1956  G. T. RANDOL  2,770,949
POWER-ASSISTED OPERATING MECHANISM FOR
HYDRAULIC PRESSURE SYSTEMS
Filed Aug. 20, 1952  2 Sheets-Sheet 1
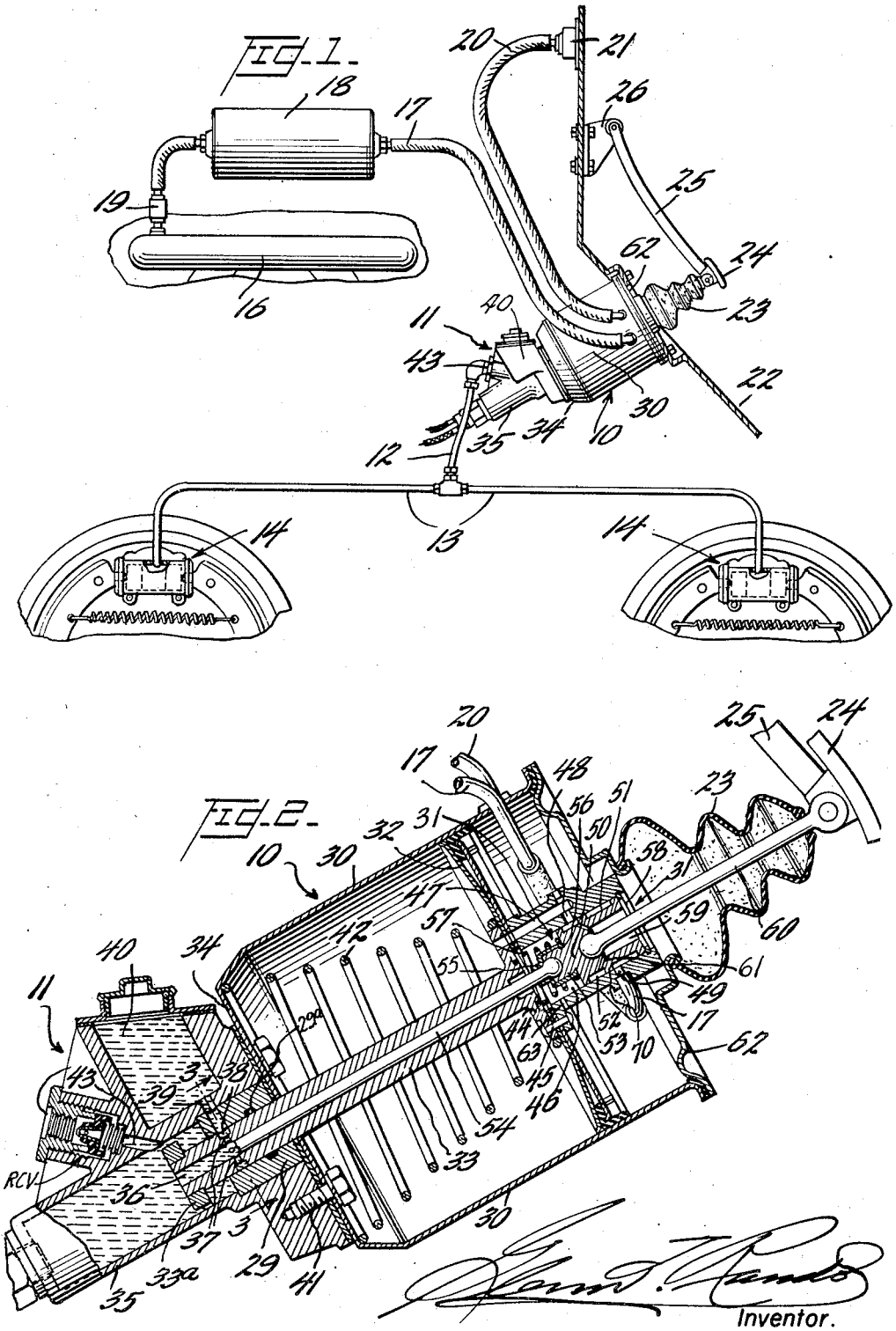
Inventor.

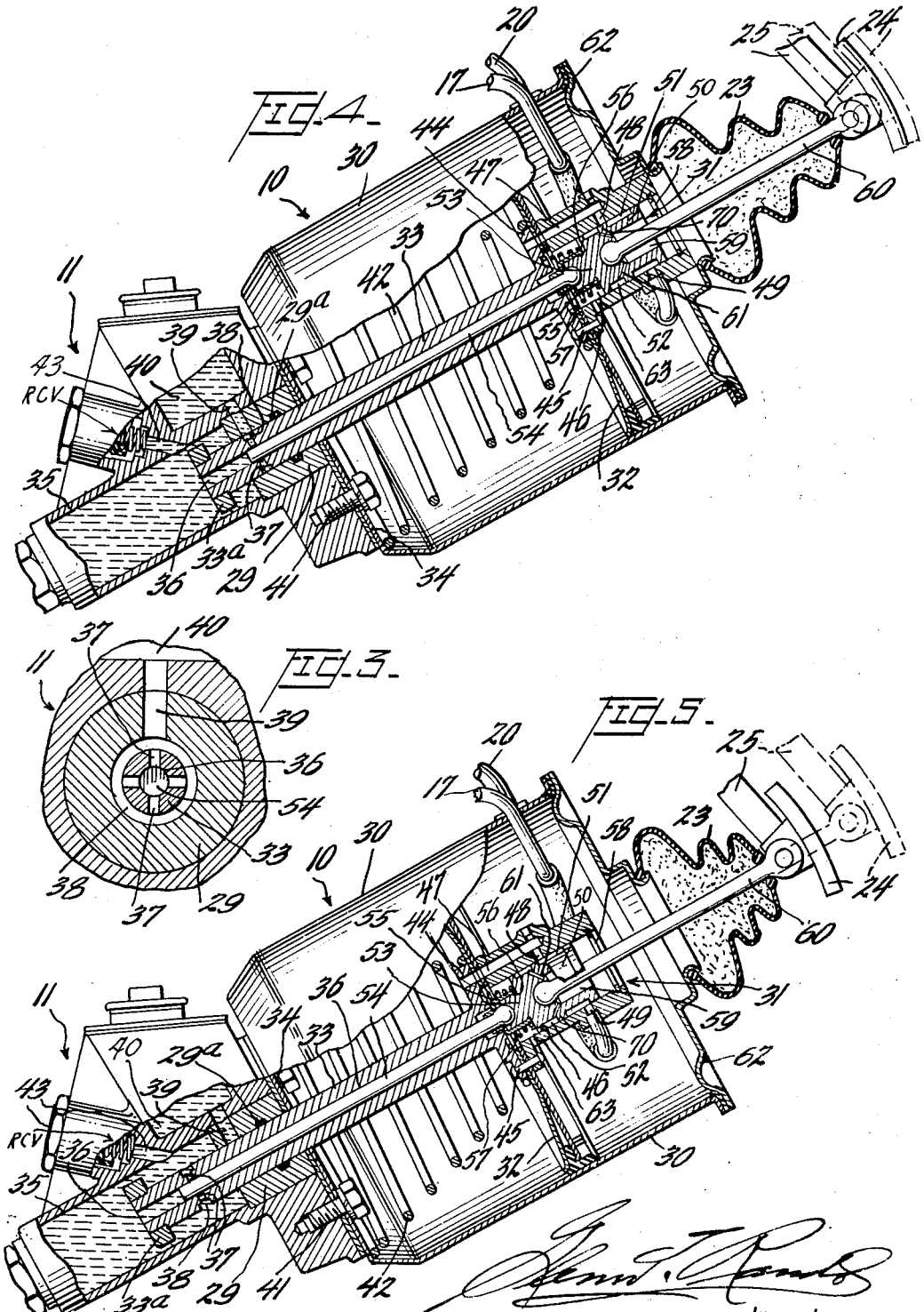

United States Patent Office 2,770,949
Patented Nov. 20, 1956

2,770,949

POWER-ASSISTED OPERATING MECHANISM FOR HYDRAULIC PRESSURE SYSTEMS

Glenn T. Randol, Mountain Lake Park, Md.

Application August 20, 1952, Serial No. 305,460

11 Claims. (Cl. 60—54.6)

The present invention relates to power-assisted operating mechanism in which physical operating force is supplemented by power assistance, said mechanism including a liquid pressure producing device which is intended primarily as an actuator for hydraulic brake systems of automotive vehicles and the like, although other uses are obviously feasible, and has for its general aim and purpose to simplify the construction of such mechanism, to render the same more efficient, and generally to prolong the service life thereof.

More specifically, the present invention relates to vacuum servomotor actuated hydraulic brakes. As commonly employed on automotive vehicles, such brakes are under the control of the driver by means of a treadle-or-pedally-controlled air valve which when operated renders the vacuum power device effective to actuate the hydraulic brakes. A primary object of the present invention is to provide this apparatus with novel means for conditioning such systems to produce hydraulic thrust and to transmit directly to the treadle and to the operator's foot, reactive pressures proportional to the brake applying hydraulic pressures in the hydraulic system.

A further important object of the present invention is the provision of a novel hydraulic master cylinder comprising a power, actuated piston-like element or plunger, and a personally-actuated similar element, both projecting into the fluid working chamber and activatable separately and jointly to effect volumetric displacement of fluid under pressure into the wheel cylinders of the braking system to operate the brakes at different efficiencies.

An object related to the immediately preceding object is to arrange the said plunger elements for limited relative movement in co-operatable relationship to control fluid communication between the hydraulic cylinder reservoir and working chamber thereof.

A further object related to the two objects immediately above is to associate novel fluid compensating valve means with the plunger elements whereby fluid communication is established between the reservoir and pressure producing chamber with the brakes in normally released condition, said fluid valve means being effective to cut off said communication in response to said relative movement actuation of said plungers prior to energization of the power-actuated plunger to apply the brakes.

A further salient feature of the present invention is to adapt the hydraulic master cylinder of a conventional hydraulic braking system for novel reception of the free end of a treadle-actuated plunger into the fluid pressure producing chamber thereof, said plunger having limited movement to vary the volumetric displacement of fluid independently of another fluid displacing element disposed in said fluid pressure chamber, but such displacement being insufficient to cause operation of the brakes.

An object related to the object next above is to so correlate the functions of said plunger and element that the limited independent movement of the plunger causes actuation of the element whereby conjoint actuations of the plunger and element may ensue to volumetrically displace sufficient fluid under pressure into the hydraulic braking system to apply the brakes at whatever efficiency desired.

A further object related to the two objects next above is to utilize the plunger as a valve means for controlling the flow of fluid from the reservoir into the pressure working chamber and vice versa during such limited actuation thereof corresponding to initial actuation of the treadle to energize the said fluid displacing element causing brake application with consequent reacting proportional braking force transmitted through the treadle to the operator's foot, and wherein such initial advancement of the plunger cuts off the flow of fluid to the pressure working chamber, and corresponding retraction thereof which places the treadle in full brake released position, opens the reservoir to the pressure working chamber to replenish any loss of fluid therefrom and to enable excess fluid in the system to return to the reservoir.

A further object related to the three objects next above is to provide novel means associated with the fluid displacing element whereby initial actuation thereof to apply the brakes cuts off the fluid communication between the reservoir, and pressure working chamber of the hydraulic master cylinder, irrespective of the extent of subsequent movements of the plunger within the limits of its independent actuating range.

A further important object of the present invention is to provide in a combined vacuum and hydraulic unit for power brakes utilizing engine intake manifold vacuum and atmosphereic pressure for its actuation, improved and novel air control valve mechanism for controlling said actuation and simultaneously transmitting directly to the operator's foot a reduced pressure reaction substantially proportional to brake applying pressure induced by actuation of the said combined power unit.

A further related object to the two objects last stated above is to incorporate in a novel manner, the said fluid control valve means in the aformentioned dual plungers whereby one of the plungers is utilized to impart a reduced pressure reaction to the operator's foot during such relative movement thereof to close off fluid communication between the hydraulic reservoir and pressure producing chamber while the other plunger operatively connected to the vacuum unit subsequently effects maximum volumetric displacement of fluid under pressure from said pressure chamber into the wheel cylinders to apply the brakes.

The present invention has as a further important object the modification of a conventional hydraulic master cylinder in a novel manner whereby a personally-actuated plunger and a power-actuated plunger of larger dimension are introduced into the fluid working chamber for advanceable and retractable actuation therein to effect volumetric displacements of said fluid from the working chamber in proportion to the relative sizes of said plungers to apply the brakes, and wherein the personally-actuated plunger is further adapted to close off fluid communication between the aforementioned reservoir and working chamber upon initial actuation thereof independently of the power-actuated plunger.

An object related to the object last stated above is to associate novel control valve means for said power-actuated plunger with the personally-actuated plunger whereby initial actuation of the latter plunger actuates the control valve means to cause energization of the power-actuated plunger with corresponding power-actuated followup maintaining said energization; whereupon, minute advancing and retracting actuations of the personally-actuated plunger being effective to actuate the control valve means to cause the power-actuated plunger to correspondingly apply and partially release, respectively, the hydraulic wheel brakes with full release of the brakes effected upon de-energization of the power-actuated plunger by fully releasing the personally-actuated plunger.

A more specific object of the present invention is to utilize the energizable power element of a vacuum servomotor for displacing fluid under pressure from the hydraulic master cylinder, and wherein said power element comprises dual valve means for controlling the isolation of the fluid working chamber from the reservoir fluid, energization and de-energization of the servomotor, and displacement of fluid into the braking system under pressure to apply the brakes and restore such displacement to normal pressure to release the brakes.

A still further object of the present invention is to provide a simple and rugged construction in which the hydraulic pressure producing means may be actuated directly by the driver in the event of partial or complete failure of the power means.

Other objects and advantages of the present invention will become apparent to persons skilled in the art by reference to the following description and the accompanying drawings which illustrate a presently preferred embodiment of the invention, it being understood that many variations of the principles involved and falling within the scope of the appended claims may be had.

In the drawings:

Figure 1 is a schematic view of a side elevation of my improved power-assisted operating mechanism constructed in accordance with the present invention, and shown connected diagrammatically to operate a conventional hydraulic braking system of an automotive vehicle or the like;

Figure 2 is a longitudinal sectional view on an enlarged scale, partly in side elevation, of the brake operating mechanism per se shown in Figure 1 wherein the brakes are in fully released condition;

Figure 3 is a transverse sectional view taken along the line 3—3 of Figure 2 looking in the direction of the arrows, and showing details of the coaxially disposed hydraulic plungers and associated compensating valve means between the fluid reservoir and pressure chamber;

Figure 4 is a view similar to Figure 2 showing the initial brake applying operation of the mechanism; and Figure 5 is another view similar to Figures 2 and 4 showing the operated positions of the parts involved when the brake pedal is depressed to cooperate with the vacuum servomotor or act independently thereof to apply the brakes.

Referring to the drawings:

The braking system involved in the present application provides a hydraulic braking system which includes a hydraulic pressure producing section for the transmission of hydraulic pressure to the several brake units on the vehicle, a servomotor preferably in the form of a vacuum-operated power device for operating the hydraulic section, and a valve control for the vacuum power device and the hydraulic unit. The system generally is well illustrated in Figure 1 of the drawings. The power brake unit of the present invention is generally indicated by the reference character 10. The hydraulic section is generally designated by the reference character 11 as an integral component of the unit and shows conduits 12 and 13 which transmit hydraulic fluid under pressure to hydraulic wheel cylinders 14. The vacuum-actuated power unit is connected to an intake manifold 16 of the vehicle engine through conduit 17, a reserve vacuum tank 18, and a check-valve 19, said valve enabling the utilization of stored vacuum for limited braking operations when the engine is stopped and to maintain uniform vacuum conditions irrespective of pressure changes within the manifold while the engine is operating. The unit is also connected to the atmosphere through conduit 20 and air filter 21. The brake unit 10 is mounted on the under side of the vehicle toe board 22 in the operator's compartment as shown and the portion thereof that projects through the floorboard for operation is preferably encased in a protective flexible bellows 23. A treadle 24 is held in position by a link 25 which is pivotally mounted at its upper end to a bracket 26 secured to the vehicle firewall.

The system as thus far described is well known. The present invention however is directed primarily to the construction and operation of the power brake unit 10 and its cooperative relationship with the hydraulic pressure producing section 11 thereof. This unit forms a unitary assembly and comprises the power brake hydraulic section 11, a vacuum power cylinder and piston arrangement and a concentrically disposed followup air control valve unit 31. While prior art devices of the present type also comprise these three operating components, the present invention includes structural and functional modifications of each of these components which bring about a novel cooperation between such components to produce results not comprehended in such prior art devices, as will appear. For example, prior art devices of the type under consideration embody a flexible reactive vacuum-diaphragm assembly including springs and other associated elements for providing driver "feel" during braking operations. However, these devices fail to provide driver "feel" in true proportion to the braking hydraulic pressure applied. This is so because the reaction is indirect, being from the vacuum force only, and because the initial movement of the treadle to operate the air control valve to servo-energizing position is characterized by lost motion, thus being devoid of a reacting function on the operator's foot. Further, in these prior art devices, the hydraulic power unit is rendered effective by the driver's foot operating substantially concurrently with the operation which renders the vacuum power unit effective which tends to induce an unpredictable control effect during the critical initial phase of brake application with potential overbraking as a result. These deficiencies are eliminated in the present device wherein the air valve control assembly constitutes a mechanical followup unit which is operable directly by the driver, and which has its free end exposed to the hydraulic pressure in the hydraulic section 11. In consequence of this arrangement, pressure reaction against the driver's foot is direct and substantially proportional to the effective braking power at all times. The structural features which bring about these novel results will become apparent from the following descriptive portion of the specification:

The vacuum-actuated power device 10 comprises a cylinder 30 and a piston 32 reciprocable therein. A plunger 33 which may be termed a "pressure-transmitting" member in a broader patent sense, is carried by the piston 32 and passes through bottom 34 of the cylinder and enters the hydraulic cylinder 35 through the collar 29 which carries an internal annular oil seal ring 29a in surrounding fluid tight relation to the plunger 33. The plunger 33 is provided with a central rifled bore 36 coextensive therewith, and extending therefrom through the wall of said plunger is a plurality of radial passages 37 as shown particularly in Figure 3 and which communicate with an annular groove 38 on the exterior of the plunger 33 to form what may be termed a "compensating valve." To facilitate assembly of the plunger through the bore of the collar 29 and bottom end 34 of the cylinder 30 and to provide different fixed displacements of fluid at a given position of the plunger, a detachable annular collar or head 33a is press-fitted on the lower (left) reduced shouldered end thereof whereby novel modulation of initial brake application sensitivity is provided according to the size of the head 33a employed for a predetermined stroke of the plunger 33 as will hereinafter become apparent from a more detailed discussion of this novel feature. In the normal released position of the braking system, the annular groove 38 is in registry with a passage 39 which extends radially through the collar 29 and into a reservoir chamber 40, and whereby communication is established between the hydraulic chamber 35 and the reservoir 40. The entire hydraulic section 11 is mounted on the bottom end of the cylinder 30 by cap screws or the like. A return spring 42 in the cylinder 30 maintains the piston 32 and operatively connected plunger 33 in their normal released positions as shown in Figures 1 and 2 of the drawings. The hydraulic cylinder 35 is also provided with one or more outlets 43 via a conventionally illustrated residual pressure valve generally designated "RCV," for the transmission of hydraulic thrust to the several brake cylinders 14.

Further discussing the fluid flow control characteristics of the collar-like element 33a carried by the plunger 33, it is desired to importantly point out that the outer diameter of this element in relation to the bore of the hydraulic cylinder 35, defines an annular space therebetween. This space may be increased or made more restrictive by altering the overall diameter of the element 33a whereby any desired degree of fluid flow restriction therethrough may be established. Therefore, with the aforestated fluid control through the annular space restricted, volumetric displacement of fluid from said hydraulic cylinder is momentarily increased to effect a quick initial application of the brakes by an abnormal accelerated actuation of the plunger 33. Such accelerated braking operation tending to produce a partial vacuum condition at the rear (right) side of the element 33a due to the restricted flow of fluid through the annular space which in effect unbalances the fluid pressure condition about said element enabling treadle and/or power actuation of the plunger 33 and element 33a to initially displace a larger volume of fluid into the wheel cylinders 14 than normally capable of with less restrictive space effective.

Thus, with the annular space closed down to such an extent as to cause the aforesaid temporary vacuum condition behind the element 33a, accelerated plunger movement can displace fluid in volume exceeding that controllable by the plunger when normally actuated with the annular space so adjusted as to accommodate substantially balanced fluid conditions about the plunger 33 and element 33a irrespective of mode of movement thereof.

The upper (right) end of the plunger terminates in an enlarged annular flanged portion 44 which is fixed to the under central face portion of the piston 32 as by rivets 45. The rivets also serve to hold fixedly on the opposite central face of the piston 32 the air control valve 31 which has a cylindrical bore therethrough forming a chamber 46. In its walls the chamber 46 is provided with a longitudinal passage 47 which passes through the piston 32 and communicates with the vacuum power chamber formed between the under side of the piston and the bottom wall 34. The passage 47 also communicates with a lateral passage or port 48 which extends into the interior of the chamber 46. The walls of the chamber 46 also have a passage or port 49 to which the vacuum conduit 17 is flexibly connected.

Disposed within the valve chamber 46 is a slidable air valve element 50. This valve is provided with an exterior annular groove 51 normally in communication with the passage 49 and the vacuum conduit 17. The valve element 50 also has an exterior annular groove 52 which is normally in communication with the port 48 and through passage 47 with the vacuum chamber of the cylinder 30. The valve element 50 is provided with a reduced portion 53 which forms a ball and socket joint for the reception of the ball end of a pressure reacting valve rod 54 disposed substantially coextensively within the bore 36 of the plunger 33 for predetermined relative sliding movement therein. A cap 55 is spun over the reduced portion 53 and its end is forced into a small annular undercut as shown at 56 thereby capturing the valve rod 54 and air valve element 50 in connected operative relationship. A valve return spring 57 is disposed between the shoulder on the valve element 50 and the upper face of the plunger flange 44. Numeral 58 designates a stop ring which serves as an abutment for limiting the upward movement of the valve element 50 responsive to the action of spring 57. In the normal or brake released position of the system, the upper end of valve element 50 engages against said stop ring as demonstrated in Figure 2. It should be evident therefore, that the aforesaid limited relative movement of the valve rod and connected element 50 with respect to plunger 33 is defined by the stop ring 58 and the upper face of the flange 44 of said plunger.

At its larger end the valve 50 is provided with a well chamber 59 and its bottom forms a ball and socket joint for the reception of the ball end of a valve push rod or link 60 which is operatively connected at its opposite end to the brake treadle 24 as shown. The annular passage 52 on the valve 50 is provided with angularly disposed venting passages 61 that communicate with the chamber 59 and serve to provide atmospheric pressure condition in the vacuum power chamber of the cylinder 30 under normal brake released conditions. A cover 62 is provided for the upper end of the cylinder 30 and comprises an extruded circular embossment having an opening through which the push rod projects, defined by a peripheral wall formed by rolling the opening edge outwardly and upwardly to produce an external annular channel with that portion of the wall of the embossment parallel to the cover proper, said channel being adapted to anchor the larger end of the flexible push rod boot 23. The outer end of the casing of the power control valve 31 is disposed in confronting alignment with a complemental marginal portion of the cover adjacent the opening in the circular embossment aforesaid whereby fully retracted status of the mechanism, as shown in Figure 2, is established by the cover acting as a stop for the movable power assembly 31, 32, 33 influenced by the return spring 42. The casing of the air valve 31 also has one or more passages 63 to maintain atmospheric pressure below the slide valve 50.

In the present apparatus the valve control unit 31 comprises the slidable followup element 50, the valve push rod 60 at one end thereof and the pressure reacting valve rod 54 operably connected at the other end of said element. The valve rod 54 extends in its normal retracted position to the radial passages 37, and these three elements constitute what may be termed a mechanical followup unit which is slidable in unison and which controls the followup air valve 31 in the vacuum power unit 10 and the liquid shut-off compensating valve 37, 54 in the hydraulic pressure section 11 thereof. When this unit is initially displaced relatively downwardly from the position of Figure 2 to the position of Figure 4, the first effect is to cut off communication between the hydraulic reservoir 40 and the hydraulic working chamber 35 by the pressure rod 54. This operation conditions the hydraulic section 11 effective and operable to transmit hydraulic thrust as soon as the plunger 33 is moved downwardly. Immediately thereafter a minute further relative movement of the valve control element 50 in the same direction establishes connection from the vacuum source 16 through the check valve 19, reserve tank 18, conduit 17, and passages 49, 51, 48, and 47 leading to the vacuum side of the piston 32 and into the vacuum power chamber. At this point therefore, the piston 32 is operatively energized by the atmospheric pressure operating and working against the upper side of the piston against the return spring 42, and the plunger 33 is moved therewith further into the hydraulic chamber 35 displacing the fluid trapped therein by closure of the radial passages 37 whereby hydraulic thrust is transmitted via the residual pressure valve RCV and discharge port 43 to the brake cylinder 14. The initial movement of the plunger 33 now provides a second closure for the passage 39 as will be observed from the positions of the parts as shown in Figure 5 thus insuring complete isolation of the hydraulic reservoir fluid from the pressure fluid in the chamber 35 during further relative movement of the valve pressure rod 54 and element 50 with respect to the plunger for controlling the operation of the piston 32 to apply and partially release the brakes irrespective of the extent of advancement and retraction of the plunger from the positions shown in Figures 2 and 4. As the hydraulic plunger 33 is moved into the hydraulic cylinder 35, the air valve chamber 46 is being moved therewith and in order to increase the application of the brakes the valve control element 50 is continually pressed or advanced to followup the movement of the energized piston 32 and connected valve chamber 46 in order to maintain proper vacuum connections to keep the vacuum cylinder 30 energized. The free end of the valve rod 54 is exposed to the hydraulic pressure created in the hydraulic chamber 35 during brake application and transmits this pressure through the valve element 50 and push rod 60 to the pedal 24 and the operator's foot. This reactive pressure upon the operator's foot therefore serves as a measure of the braking power being transmitted and which may be modified at will by substituting coaxial plungers of different relative diameters. In case of engine failure or other failure of the vacuum source, the valve element 50 is pressed directly against the upper face of the plunger flange 44 as shown in Figure 5 and the hydraulic brakes are then operated and applied directly by the operator without any aid from the vacuum power unit 10.

The valve rod 54 is primarily a pressure reactive rod serving to transmit a pressure reaction directly to the treadle 24 and to the operator's foot which is substantially proportional to the brake pressure. It is desirable that the rod should normally extend as near to the plunger head 33a as possible. For this reason it is shown in the form herein as extending substantially adjacent the radial openings 37. Thus the pressure rod 54 also operates as a preliminary valve closure for the passages 37 to isolate the hydraulic reservoir fluid 40 from the working fluid in the hydraulic chamber 35 during brake application and to accommodate replenishment of fluid loss in the chamber 35 and exhaustion of fluid therefrom in the case of excess fluid in the system, when opened by full release of the brakes. It will be understood, however, that this valve function of the pressure rod may be omitted with consequent slight loss of fluid from the working chamber into the reservoir by relying on the first movement of the plunger 33 to close off communication between the fluid chambers 35 and 40.

It is important to note that the valve element 50 and connected elements 54, 60 have limited relative movement with respect to the piston 32 and connected plunger 33 and air valve chamber 46 while pressure is effected by advancing the treadle 24 to maintain the piston 32 energized and the brakes applied as desired, whereas the piston 32 and connected elements 33, 46 move relatively with respect to the valve element 50 and connected elements 54, 60 when the latter are stopped to produce an applied "holding" position of the brakes or fully released condition thereof.

Operation

Figures 2, 4, and 5 show the three positions of the followup valve control unit 31 with reference to the cooperating personal and power actuated elements. Figure 2 illustrates brake released position, and wherein the annular valve passage 52 is disposed in registry with passage 48 to connect the vacuum power chamber of the cylinder 30 with atmosphere via passages 49 and 61, with the consequence that both sides of the piston 32 are open to atmosphere since the upper chamber formed between the piston 32 and cylinder cover 62 of the cylinder 30 is constantly subjected to atmospheric pressure through the conduit 20 and air filter 21, the return spring 42 is therefore in its extended pre-energized condition and all of the parts are disposed as shown.

With the engine running and the brakes fully released, vacuum from the intake manifold 16 is transmitted through the check valve 19, reserve tank 18 and vacuum conduit 17 to the vacuum connection on the vacuum cylinder 30, through the coiled internal continuation of the conduit 17 to the vacuum connection on the air control valve body assembly 31, through the port 49 in said valve assembly to the annular passage 51 on the sliding valve element 50. Since the treadle 24 is released, the sliding valve element 50 is also in its released position (see Figures 1 and 2) by action of the valve return spring 57. In this position, the sliding valve annular land 70 seals the vacuum from further communication with other parts of the valve and the vacuum chamber of the cylinder 30.

Atmosphere, with the brake treadle 24 in the released position of Figure 2, is transmitted through the air cleaner 21 and atmospheric conduit 20 to the atmospheric connection on the vacuum power cylinder 30, through the atmospheric chamber of the cylinder 30, past stop split ring 58 to well chamber 59, through angular passages 61 in sliding valve 50 to annular pasage 52 on the sliding valve, through passages 48, 49 to the vacuum power chamber of the cylinder 30.

With atmosphere in both chambers of the cylinder 30, the piston 32 is held in its fully released position as shown in Figures 1 and 2 wherein the upper end of the power control valve housing abuts said portion of the inner face of the cylinder cover 62, by the action of the piston return spring 42. When both the vacuum cylinder piston 32 and its sliding control valve 31 are in their respective fully released positions, the various parts of the hydraulic section 11 are also in brake released position with the free end of the valve rod 54 disposed to the right of the radial passages 37 whereby fluid flow between the brake fluid reservoir and the hydraulic cylinder 35 is accommodated through annular passage 38 and vertical passage 39 as required by expansion, contraction or leakage of the fluid in the hydraulic circuits. The fluid control valve 37, 54 is closed to isolate the reservoir fluid from the working fluid in the hydraulic cylinder 35 by relative movement of the valve rod 54 relatively to the plunger 33 to the position shown in Figure 4 in response to initially depressing the treadle 24.

As the brake pedal 24 is depressed by the driver, the sliding valve element 50 is moved leftward from the position of Figure 2, to the positions of Figures 4 and 5 according to the braking effect desired. During this sliding movement of the valve element 50, the annular land 70 moves into registry with the port 48 and thence to the opposite side (left) of port 48 closing off communication of atmosphere in annular passage 52 with the vacuum power chamber of the cylinder 29 and connecting the vacuum source with the vacuum cylinder chamber to energize the same by introducing a pressure differential across the piston 32 causing the piston to move leftward pushing the hydraulic plunger 33, 33a further into the hydraulic chamber 35. The initial movement of the plunger 33 closes the passage 39 by corresponding movement of the annular passage 38 out of registry therewith and while so closed, the treadle 24, valve element 50, and valve rod 54 may be actuated in unison through a limited range of relative movement independently of the plunger 33 without causing the passage 39 to be reopened, thus enabling followup control of the plunger 33, 33a to apply and partially release the brakes as desired. The force exerted at the brake pedal 24 and the force exerted by the vacuum power cylinder piston 32 combine at the hydraulic plunger 33, 33a to create, because of the volumetric displacement of fluid by the plunger 33 and rod 54 into the hydraulice system, the hydraulic pressure applied to the brake system.

At the same time that a pressure differential is brought about across the vacuum power cylinder piston 32 to move it leftward, a proportionally reduced reacting hydraulic pressure is effective across the free end of the valve rod 54 by virtue of volumetric displacement of fluid from hydraulic cylinder 35 into the braking system by advancement of the plunger 33 therein. This "reactionary" force is transmitted through the valve rod 54 to sliding valve element 50, thence through link 60 to the brake treadle 24. Such force gives the driver the "feel" of the brakes, since the "reactionary" force increases in direct proportion to the degree of brake pressure applied. The reaction and valve return spring 57 is provided to supplement the fluid pressure reactionary force caused by the brake shoe return springs acting through the wheel cylinder units 14 to release the brakes, to enable operation of the sliding valve relatively sufficiently to cause cylinder piston 32 movement and fluid pressure increase to a point of brake shoe and drum contact with only enough "reactionary" force through the treadle 24 to approximately balance the weight of the driver's foot thereon. Spring 57 also acts on the valve element 50 in opposition to foot pressure on the treadle 24 to adjust said valve relatively with respect to the valve casing thereof mounted on the upper face of the piston 32 to all positions of vacuum control within the range of its limited independent movement whereby movements of the treadle 24 cause corresponding movements of the piston 32 to operate the hydraulic brakes.

When sufficient braking force is obtained, and the driver stops increasing the pedal force which causes the sliding valve 50 to advance leftward to progressively maintain the piston 32 energized, the piston 32 and valve casing 31 will continue to slightly advance relatively to the sliding valve element 50 to valve "lapped" position wherein the piston 32 is held suspended by the vacuum trapped in the vacuum cylinder due to port 48 being fully closed by the annular land 70. Hydraulic pressure is thus maintained in the braking system to produce what is termed the brake "holding" position. Stated differently, as soon as pedal pressure on the air control valve 31 stops increasing, the hydraulic plunger 33 moves with the piston 32 and valve housing 31 as a unit leftward sufficiently from any brake operating position between Figures 2 and 5 to place port 48 in registry with annular land 70. With port 48 covered (lapped position), vacuum which had entered the vacuum power cylinder 30 is trapped and no further action can take place until the pedal pressure against the control valve 31 is either increased or decreased, and thus the brakes are held in their applied position. Partial release of the treadle 24 from any brake applying position thereof will cause a similar valve "lapping" operation to occur in the opposite direction (rightward) whereby the piston 32 and valve 31 move sufficiently rightward to place the port 48 in registry with the annular land 70, thereby closing port 48 and trapping the vacuum in the vacuum cylinder 30 to set the brakes in applied "holding" position.

When foot pressure is fully released from the brake pedal 24, air valve return spring 57 moves the sliding valve element 50 correspondingly rightward to restore the limited relative movement thereof and closing off communication of vacuum in annular passage 51 with the vacuum chamber of the cylinder 30 and opening communication of atmosphere in annular passage 52 with said vacuum cylinder chamber. With atmosphere on both sides of the vacuum power cylinder piston 32, piston return spring 42 and reacting hydraulic pressure caused by action of the brake shoe release springs, forces the piston rightward to its normal position of Figure 2, hydraulic plunger 33 is returned therewith along with valve rod 54, and the fluid flow communication between the hydraulic brake reservoir 40 and working cylinder 35 re-established by opening of the compensating valve 37—54 to place the passage 39 in communication via annular passage 38 with central bore passage 36. Hydraulic fluid, which had been displaced into the wheel cylinders, returns through the hydraulic circuit conduits into the pressure working chamber 35 as brake shoe return springs pull the brake shoes away from brake drums to fully release the braking action therebetween.

It is thus seen from the preceding description that the annular land 70 on the sliding valve element 50 cooperates with the port 48 to control the application of vacuum to the under side of the piston 32 with the consequence that the piston and plunger 33 are movably energized by the atmospheric pressure effective on the upper (opposite) side of the piston against the action of the return spring 42, thereby constantly increasing the hydraulic pressure applied to the wheel brake units 14, and when the driver releases his pressure from the pedal 24, then the valve control unit 31 correspondingly withdraws to the position shown in Figures 1 and 2, if full brake release is desired, and all of the remaining parts of the apparatus are similarly moved to their normal positions shown therein.

As is shown in Figure 5, when the brakes are being applied and the operator is pressing the treadle 24 so that the slide valve 50 is maintained advanced in the position shown with the annular land 70 below the port 48 and the vacuum chamber of the cylinder 30 thus being subjected to the vacuum or suction from the intake manifold 16, the lower or left end of the slide valve element 50 is in direct operative engagement with the upper face of the plunger flange 44. By this arrangement, therefore, the operator and servomotor 10 are both operating and cooperating to apply the brakes, the distribution of such cooperative work being determined entirely by the operator in relationship to the power capacity of the servomotor.

It is further apparent from the preceding disclosure that this novel air-hydraulic power brake provides a reduced pedal or treadle travel with corresponding reduction in operator effort compared to that required for operating conventional hydraulic braking systems. The reduced pedal travel brings pedal movement within approximately that of the engine accelerator pedal and substantially in the same fully released plane thereof, enabling the driver to transfer his toe from one pedal to the other without lifting his foot from either pedal operating position. In case of engine failure and consequent loss of vacuum production, the brakes will function satisfactorily for a limited number of power-applying operations from the stored vacuum in the reserve tank 18 which when exhausted, the brakes may be applied directly by the driver although requiring greater effort. The residual check valve RCV is interposed in the hydraulic outlet connection 43 to maintain residual line pressure as conventionally employed in hydraulic braking systems.

Further discussing the novel dual functions of the air valve return spring 57, it is desired to point out that the strength of this spring should be sufficient to counterbalance the combined weights of the treadle mechanism 24, 25 and the foot of the operator with or without physical tension thereon depending on the degree of braking force "feel" desired. This spring has as one of its important functions to accommodate the relative movement of the sliding valve element 50 to its operating positions with respect to the valve chamber 46 as determined by operator treadle movement, to control operative energization of the servomotor 10; the other equally important function is to provide operator "feel" to prevent an undesirable lost-motion initial movement of the valve element 50 during relative movements of said element within the limits thereof, to cause energization of the servomotor 10 for actuating the hydraulic pressure producing section 11 to apply and release the wheel brake units 14 according to the braking force required. Thus it may be said that the spring 57 serves to return the sliding element 50 and connected treadle 24 to "off" position when said treadle is fully released or in corresponding adjusted position to said treadle as depressed, and during initial depressing of the treadle, to enable the operator to properly apply the power force of the servomotor 10 through the hydraulic section 11 to operate the wheel brakes by requiring the operator to initially apply sufficient force on the treadle 24 to counterbalance the "reactionary" force of said spring before actual movement of the slide valve 50 results in causing the servomotor 10 to be energized. Further, the relative movement of the slide valve 50 with respect to the chamber 46 is predetermined by the upper face of the flanged end 44 of plunger 33, and the stop ring 58 whereby maintenance of the slide valve in relatively moved operating position in relation to the chamber 46 enables the servomotor 10 to apply and partially release the wheel brake units 14 in response to treadle operation, with the full braking force reacting proportionally on the element 50 and treadle to the operator's foot; whereupon, full release of the treadle correspondingly positions the valve 50 in "off" position (see Figure 2) causing deenergization of the servomotor with full release of the wheel brakes.

Summarizing the structural and operative characteristics of the essential components comprising the disclosed novel and improved power-brake system: the vacuum power cylinder 30 illustrated by way of example, contains the piston assembly 32 and the piston return spring 42. When the brakes are in full released position, atmosphere is impressed on both sides of the piston in the cylinder and the return spring 42 moves the piston to and holds the same in "off" (right) position. The air control valve unit 31 contains the relatively movable element 50, and is actually integral with the power cylinder piston 32 and moves as the piston moves during followup operation of the unit so that the valve element 50 is maintained adjusted in relative operative position by foot pressure on the treadle 24. The power brake hydraulic section 11 contains the hydraulic working chamber or cylinder 35, the hydraulic plunger 33, the seal 29a which prevents leakage between the hydraulic chamber and the vacuum cylinder chamber, the brake fluid reservoir 40, the compensating fluid passage 39 and the valve 37, 38, and 54 therefor, and the residual check-valve RCV associated with the hydraulic cylinder outlet 43. The collar 33a hereinbefore referred to and as illustrated in Figures 2, 4, and 5, provides in conjunction with the normally exposed portion of the plunger 33 in the hydraulic working chamber 35, a fixed displacement of fluid from said chamber in normally released Figure 2 position. When said plunger is additionally projected into said chamber as shown in Figure 5 to apply the brakes, the displacement of fluid into the wheel cylinders 14 is proportional to such additional plunger exposure. The annular space obtaining between the outer diameter of the collar and bore of the chamber 35 may be varied by changing the diameter of the collar whereby a temporary vacuum is created behind the collar with resultant momentary increase of fluid expended into the wheel cylinders upon accelerated actuation of the plunger.

As will be appreciated from the present disclosure, the novel compensating valve means 36, 37, 38, 39, 54 between the hydraulic reservoir 40 and pressure chamber 35 constitute one of the key features of the instant invention. This valve means functions sequentially to control the passageway 39 responsive to initial relative movement of the reactive valve rod 54 in a brake applying direction with respect to the hydraulic plunger 33 to close ports 37 followed by initial relative movement of the plunger 33 in the same direction with respect to the passageway 39 to isolate the latter from the annular channel 38 carried by the plunger. In this manner the hydraulic pressure chamber is conditioned to develop pressure on the liquid confined therein upon further projection of the plunger 33 and rod 54 into said chamber. Relative unison movement of the valve rod 54 and slide valve 50 with respect to the plunger 33 is accommodated for controlling energization of the vacuum-power device 10 at any brake applying position thereof notwithstanding ports 37 would be opened should the rod 54 be fully released with respect to the plunger. Accordingly, communication between the hydraulic pressure chamber and reservoir cannot be re-established unless the plunger 33 and valve rod 54 are in their respective released positions portrayed in Figure 2 wherein the annular channel 38 is in alignment with the passageway 39 and the free end of the rod 54 is disposed to the right of ports 37 placing the latter in communication with the pressure chamber via the bore 36. This novel bypass control between the reservoir and pressure chamber provides the special advantage of operator conditioning of the pressure chamber to displace liquid under pressure through the discharge port 43 prior to inauguration of the power phase responsive to relative movement of the slide valve 50 as is understood.

The power-brake apparatus herein disclosed is readily adaptable for use on heavy-duty automotive vehicles, such as buses and trucks, equipped with an air compressor usually driven from the engine whereby the reserve tank 18 may be charged with super-atmospheric pressure through the check-valve 19 reversely installed, for energizing the servo-motor 10 by directing the air pressure through the conduit 17 to the air control valve 31, thence to the upper chamber of the cylinder 30 via passages 47, 48, said chamber being provided by suitably sealing the aforesaid circular opening in the cover 62 air-tight around the push rod 60, then venting the lower chamber presently employed as the vacuum power chamber, to the atmosphere via conduit 20 and the air filter 21. The present invention, therefore, provides for the use of either sub-atmospheric (vacuum) or super-atmospheric (compressed) pressure conditions as the source of energy for actuating the servomotor 10 for the purpose and in the manner described.

Considering the terminology used in the foregoing description and in the appended claims, the identifying expressions and/or terms employed are intended to convey meanings which include the range of reasonable equivalents in the patent sense. For example; the expressions "vacuum cylinder," "servomotor," "power cylinder," "power device," "power means," "power mechanism" are intended to include any casing and/or chamber having a pressure-responsive movable assembly therein whether such assembly includes a piston, or a flexible diaphragm, or some other member serving the same purpose. The terms "bottom," "upper," "front," "rear," "rightward," "leftward," "right," "left," and other directional words or characters are intended to have only relative connotation for convenience in describing the structure as illustrated, and are not intended to be interpreted as requiring any particular orientation with respect to associated structure external to the present disclosure.

Although I have illustrated and described a preferred embodiment of my invention, I do not wish to limit such to the exact construction or arrangement of parts shown, since it is evident that modifications and substitutions may be made therein without departing from the proper scope or fair meaning of the subjoined claims.

Having thus described my invention, I claim:

1. A brake operating mechanism of the type described, comprising in combination: a vacuum power cylinder including a vacuum power chamber selectively connectable to a source of vacuum production and to atmosphere, and a hydraulic chamber for transmitting hydraulic pressure via conduits to the brake cylinders of automotive vehicle wheels; means in the power cylinder for isolating said chambers; a pneumatically-actuated piston and hollow plunger assembly reciprocably mounted in the power cylinder and having spring action toward a normal released position, the free end of said plunger operably extending into the hydraulic chamber; an air-vacuum control valve assembly including an actuable element mounted on said piston for controlling the piston-plunger assembly; a pressure reactive rod slidably mounted in the hollow of said plunger between said valve assembly and the hydraulic chamber; pedal operable means having a normal released position with respect to said piston-plunger assembly, for actuating the element of said valve assembly and the reactive rod aforesaid relatively to and simultaneously with the piston-plunger assembly in one direction; preloaded compression spring means for opposing pedal-actuation aforesaid of said valve element and reactive rod; means included in the valve assembly normally limiting the relative movent of said valve element and reactive rod with respect to the piston-plunger assembly in both directions; a hydraulic reservoir; passageway means including a port in said plunger normally open between the hydraulic reservoir and chamber when the piston-plunger assembly and pedal means are in their respective released positions; and means on the pressure reactive rod for closing said port responsive to initial relative actuation of said valve element and reactive rod in said one direction for conditioning the hydraulic chamber to transmit hydraulic pressure as aforesaid.

2. A hydraulic pressure-producing mechanism comprising: a pedal; a power cylinder having an end wall; a hydraulic cylinder mounted on the end wall of the power cylinder and having a cylindrical pressure-producing chamber which is provided with a discharge port; a centrally disposed opening through the end wall of the power cylinder; a fluid pressure-responsive movable assembly in the power cylinder; a source of fluid pressure different from atmosphere to movably energize said movable assembly; normally preloaded spring means operably disposed between the cylinder end wall and movable assembly for biasing the latter toward released position; a stop member fixed to the power cylinder for establishing the movable assembly in its released position; a hollow force-transmitting member, one end of which is fixed to the movable assembly and the other end extends through the opening in the end wall of the power cylinder into the hydraulic pressure chamber; a liquid reservoir associated with the hydraulic cylinder and having a port which opens into the pressure chamber; power control and reactive pressure means movable in part inside the hollow of the force-transmitting member and comprising a spool-type valve operably mounted on the movable assembly and disposed between a rod which extends from said pedal and a plunger having one end exposed to the pressure chamber, said pedal being operable to receive reactive hydraulic thrust from said plunger through the intermediary of said valve and rod; normally preloaded spring means for urging the power control means toward released position with respect to the hollow member; a stop element carried by the hollow member for establishing the power control means in released position; a first port in said movable assembly; a port in said valve; an annular chamber defined by two annular lands provided in spaced longitudinal relation on the outer periphery of said valve, one of said lands being operable to control communication between said two last-mentioned ports; a second port in said movable assembly in constant communication with said annular chamber and connected to said source, said annular chamber being selectively connectable with the first port in the movable assembly when the port in the valve is disconnected from said first port; a liquid passageway between the liquor reservoir and hollow member; a compensating port through the wall of the hollow member controlled by the end portion of the plunger member and normally connecting said passageway and pressure chamber when the plunger and member are in their respective released positions, said plunger being effective to close the compensating port to isolate the reservoir liquid from that in the pressure chamber responsive to initial movement of the plunger relatively to the hollow member whereby liquid under pressure is displaceable from the pressure chamber via its discharge port when the hollow member is moved from its released position.

3. The hydraulic pressure-producing mechanism set forth in claim 2 including abutment means comprising a pair of normally spaced confronting elements carried by the force-transmitting member and valve respectively, said elements being engageable responsive to pedal depression, whereby movement of the force-transmitting member is effected directly by physical operating effort.

4. The hydraulic pressure-producing mechanism set forth in claim 3 in which the other end of the force-transmitting member terminates in annular flange having its periphery spaced from the inner cylindrical surface of the pressure chamber, said flange being effective to momentarily increase displacement of liquid from the pressure chamber by creating a temporary vacuum condition therein resulting from restricted flow of liquid through said space responsive to abnormally accelerated displacing movement of said member into the pressure chamber.

5. A hydraulic pressure-producing mechanism, in which physical operating force is supplemented by power assistance, comprising: a power cylinder having an end wall; a source of power to operably energize the power cylinder; a hydraulic cylinder mounted on the end wall of the power cylinder and having a pressure-producing chamber provided with a discharge port and a liquid reservoir; an opening centrally disposed through the end wall; a fluid pressure-responsive movable assembly in the power cylinder forming with the end wall thereof a variable power chamber therebetween; normally preloaded spring means operably disposed between the cylinder end wall and movable assembly for biasing the latter toward released position; a stop member fixed to the power cylinder for establishing the movable assembly in its released position; a tubular pressure-transmitting member connected to the movable assembly and extending through the opening in the end wall into the pressure chamber; an annular sealing member located between a reduced diameter portion of the pressure chamber adjacent the end wall of the power cylinder and the outer surface of the tubular member to prevent escape of liquid from said pressure chamber; an operator-operated valve plunger member which is reciprocably mounted in the tubular member and which controls operative energization of the power cylinder by means of its movements with respect to the tubular member, the end of the plunger member adjacent the pressure chamber being subjected to the liquid pressure in said chamber, the tubular and plunger members having a combined effective liquid-displacing area less than the cross-sectional area of said pressure chamber; normally preloaded spring means for urging the plunger member toward released position with respect to the tubular member; a stop element carried by the tubular member for establishing the plunger member in released position; a liquid passageway between the liquid reservoir and tubular member; a compensating port through the wall of the tubular member controlled by the end portion of the plunger member and normally connecting said passageway and pressure chamber when the plunger and tubular members are in their respective released positions, said plunger member being effective to close the compensating port to isolate the reservoir liquid from that in the pressure chamber responsive to initial movement of the plunger member relatively to the tubular member whereby liquid under pressure is displaceable from the pressure chamber via its discharge port when the tubular member is moved from its released position.

6. A hydraulic pressure-producing mechanism, in which physical operating force is supplemented by power assistance, comprising: a differential fluid pressure operated power cylinder having an end wall; a source of fluid pressure different from atmosphere; a hydraulic cylinder mounted on the end wall of the power cylinder and having a pressure producing chamber provided with a discharge port and a liquid reservoir; an opening centrally disposed through the end wall; a fluid pressure-responsive movable assembly in the power cylinder forming with the end wall thereof a variable power chamber therebetween; normally preloaded spring means operably disposed between the cylinder end wall and movable assembly for biasing the latter toward released position; a stop member fixed to the power cylinder for establishing the movable assembly in its released position; a tubular pressure-transmitting member connected to the movable assembly and extending through the opening in the end wall of the power cylinder into the pressure chamber; a port in the tubular member to provide communication between the interior of the tubular member and the power cylinder chamber; a cylindrical valve member slidably mounted inside the tubular member, the exterior of the valve member having two reduced-diameter portions providing annular chambers which are separated by an annular land and which are in communication, respectively, with the atmosphere and said source, the atmosphere-connected valve chamber being in communication with the port in the tubular member in released position; a plunger member slidably located inside the tubular member and operatively connected at one end to the valve member, the other end of the plunger member being subjected to the liquid pressure in the pressure chamber; normally preloaded spring means for urging the plunger member toward released position with respect to the tubular member; a stop element carried by the tubular member for establishing the plunger member in released position; a liquid passageway between the liquid reservoir and tubular member; a compensating port through the wall of the tubular member controlled by the end portion of the plunger member and normally connecting said passageway and pressure chamber when the plunger and tubular members are in their respective released positions, said plunger member being effective to close the compensating port to isolate the reservoir liquid from that in the pressure chamber responsive to initial movement of the plunger member relatively to the tubular member whereby liquid under pressure is displaceable from the pressure chamber via its discharge port when the tubular member is moved from its released position; and an operator-operated member for moving the valve and plunger members from their released positions.

7. A hydraulic pressure-producing mechanism, in which physical operating force is supplemented by power assistance, comprising: a differential fluid pressure operated power cylinder having an end wall; a source of fluid pressure different from atmosphere; a hydraulic cylinder mounted on the end wall of the power cylinder and having a pressure producing chamber provided with a discharge port and a liquid reservoir; an opening centrally disposed through the end wall; a fluid pressure-responsive movable assembly in the power cylinder forming with the end wall thereof a variable power chamber therebetween; normally preloaded spring means operably disposed between the cylinder end wall and movable assembly for biasing the latter toward released position; a stop member fixed to the power cylinder for establishing the movable assembly in its released position; a tubular pressure-transmitting member connected to the movable assembly and extending through the opening in the end wall of the power cylinder into the pressure chamber; a valve housing extension provided on the connected end of the tubular member in coaxial disposition with respect thereto and having a port to provide communication between the interior of said extension and the power cylinder chamber; a cylindrical valve member slidably mounted inside the valve extension, the exterior of the valve member having reduced-diameter portions providing annular valve lands which define a pair of annular chambers in communication respectively with the atmosphere and with said source, the atmosphere-connected valve chamber being in communication with the port in the valve extension when the movable assembly of the power cylinder is in released position; a plunger member slidably positioned inside the tubular member and effective to transmit reactive liquid pressure from the pressure chamber to said valve member; normally preloaded spring means for urging the plunger member toward released position with respect to the tubular member; a stop element carried by the tubular member for establishing the plunger member in released position; a liquid passageway between the liquid reservoir and tubular member; a compensating port through the wall of the tubular member controlled by the end portion of the plunger member and normally connecting said passageway and pressure chamber when the plunger and tubular members are in their respective released positions, said plunger member being effective to close the compensating port to isolate the reservoir liquid from that in the pressure chamber responsive to initial movement of the plunger member relatively to the tubular member whereby liquid under pressure is displaceable from the pressure chamber via its discharge port when the tubular member is moved from its released position; and an operator-operated member for moving the valve and plunger members from their released positions.

8. A hydraulic pressure-producing mechanism, in which physical operating force is supplemented by power assistance, comprising: a differential fluid pressure operated power cylinder having an end wall; a source of fluid pressure different from atmosphere; a hydraulic cylinder mounted on the end wall of the power cylinder and having a pressure producing chamber provided with a discharge port and a liquid reservoir; an opening centrally disposed through the end wall; a fluid pressure-responsive movable assembly in the power cylinder forming with the end wall thereof a variable power chamber therebetween; normally preloading spring means operably disposed between the cylinder end wall and movable assembly for biasing the later toward released position; a stop member fixed to the power cylinder for establishing the movable assembly in its released position; a tubular pressure-transmitting member connected to the movable assembly and extending through the opening in the end wall of the power cylinder into the pressure chamber; a port in the tubular member to provide communication between the interior of the tubular member and the power cylinder chamber; a valve slidable inside the tubular member to selectively connect the port in the latter member to the atmosphere or to said source; an operator-operated rod connected to one end of the valve; passageway means in the valve for connecting the power cylinder chamber via the port in the tubular member to the atmosphere; a plunger member slidably located inside the tubular member in operative engagement with the other end of the valve and slidable with the valve and rod, whereby force may be transmitted from either said rod or said plunger through said valve to the other; normally preloaded spring means for urging the plunger member toward released position with respect to the tubular member; a stop element carried by the tubular member for establishing the plunger member in released position; a liquid passageway between the liquid reservoir and tubular member; a compensating port through the wall of the tubular member controlled by the end portion of the plunger member and normally connecting said passageway and pressure chamber when the plunger and tubular members are in their respective released positions, said plunger member being effective to close the compensating port to isolate the reservoir liquid from that in the pressure chamber responsive to initial movement of the plunger member relatively to the tubular member whereby liquid under pressure is displaceable from the pressure chamber via its discharge port when the tubular member is moved from its released position.

9. In hydraulic pressure-producing mechanism comprising an operator-operated member having a normal released position, a hydraulic cylinder having a chamber for displacing liquid under pressure through a discharge port and a liquid reservoir therefor, power means having a movable member with a portion thereof operably projectable into said chamber, and a source of operating power for said power means: liquid passageway means normally open between the chamber and reservoir aforesaid; and control means including a pair of elements movable relatively to said movable member to effect closure of said passageway means to condition said chamber to displace liquid under pressure as aforesaid, and to subsequently cause operation of said power means to effect in part said liquid displacement, respectively, responsive to operating said operator member from released position.

10. In a hydraulic braking system having a liquid reservoir, a pressure producing chamber equipped with a discharge port, and wheel cylinders to apply the brakes, in combination: composite piston means comprising coaxially disposed primary and secondary hydraulic pistons operably projectable into said chamber and movable relatively and in unison for displacing liquid under pressure from said chamber through said discharge port into the wheel cylinders to apply the brakes; operator-operated pedal means for operating said piston means; power mechanism including a movable power member effective to assist the pedal means in operating the primary piston for the purpose; a source of operating power for the power mechanism; control means including an element movable to operating position in unison with the secondary piston when moved relatively to the primary piston responsive to initial operation of the pedal means, to cause operative energization of the power mechanism; liquid passageway means normally open between the reservoir and pressure chamber; and means on the secondary piston operably effective to close said last-named means, responsive to initial relative movement aforesaid of the secondary piston and control means element, to condition said pressure chamber to displace liquid under pressure therefrom through said discharge port prior to operative energization of the power mechanism.

11. In hydraulic pressure-producing mechanism comprising an operator-operated member having a normal released position, a hydraulic cylinder having a chamber for displacing liquid under pressure through a discharge port and a liquid reservoir therefor, power means having a movable member with a portion thereof operably projectable into said chamber, and a source of operating power for said power means: liquid passageway means normally open between the chamber and reservoir; compensating valve means including an element constantly subjected to the pressure created on the liquid in said chamber, and movable relatively to said movable member to close said passageway means to condition said chamber to displace liquid under pressure as aforesaid, responsive to operating said operator member from released position; and power control means connected to said source and including an element movable relatively to said movable member to cause operation of said power means following closure of said passageway means to effect in part said liquid displacement, responsive to further operation of said operator member.

References Cited in the file of this patent

UNITED STATES PATENTS

| | | |
|---|---|---|
| 1,960,996 | Guernsey | May 29, 1934 |
| 2,006,487 | Sorensen | July 2, 1935 |
| 2,165,942 | Rossmann | July 11, 1939 |
| 2,260,491 | Stelzer | Oct. 28, 1941 |
| 2,458,803 | Stelzer | Jan. 11, 1949 |
| 2,463,062 | Seppmann | Mar. 1, 1949 |
| 2,532,960 | Stelzer | Dec. 5, 1950 |
| 2,644,305 | Price et al. | July 7, 1953 |
| 2,685,172 | Price | Aug. 3, 1954 |